(12) United States Patent
Nnaji (10) Patent No.: US 9,818,300 B1
(45) Date of Patent: Nov. 14, 2017

(54) PARKING SPACE MANAGEMENT SYSTEM (71) Applicant: Gregory Nnaji, Patterson, CA (US)

(72) Inventor: Gregory Nnaji, Patterson, CA (US)

( * ) Notice: Subject to any disclaimer, the term of this patent is extended or adjusted under 35 U.S.C. 154(b) by 0 days.

(21) Appl. No.: 15/278,776

(22) Filed: Sep. 28, 2016

(51) Int. Cl.
*G08G 1/14* (2006.01)

(52) U.S. Cl.
CPC .................. *G08G 1/142* (2013.01)

(58) Field of Classification Search
CPC .......... G08G 1/14; G08G 1/141; G08G 1/142; G08G 1/168
See application file for complete search history.

(56) References Cited

U.S. PATENT DOCUMENTS

| | | |
|---|---|---|
| 6,142,702 A | 11/2000 | Simmons |
| 6,292,110 B1 | 9/2001 | Budnovitch |
| 6,917,307 B2 | 7/2005 | Li |
| 8,723,689 B2 | 5/2014 | Mimeault |
| 2014/0249742 A1* | 9/2014 | Krivacic ................ G06Q 10/02 701/400 |
| 2015/0154669 A1* | 6/2015 | Wu ..................... G06Q 30/0284 705/5 |
| 2017/0004710 A1* | 1/2017 | Dozono ................. G08G 1/144 |

* cited by examiner

*Primary Examiner* — Kevin Kim
(74) *Attorney, Agent, or Firm* — Stevenson IP, LLC (57) ABSTRACT

A CPU-controlled parking space management system including a parking space guide body with light emitting diodes, a pair of weight sensors, a LCD monitor, and a strip printer in each parking space, and a parking lot guide body at a parking garage entrance and on each level indicating open parking spaces or a full level. Each of a first, a second, and a third light of the light emitting diodes on each parking space guide body bears the word "OPEN" and blinks green when both weight sensors are deactivated, bears the word "RE-PARK" and flashes amber when only one weight sensor is activated indicating incorrect parking, and has a red color when both weight sensors are activated, respectively. A bottom light emitting diode light on the parking space guide body bears the word, "RESERVED", and is illuminated blue to indicate a handicap parking space or illuminated amber for other reservations.

11 Claims, 7 Drawing Sheets

PARKING SPACE MANAGEMENT SYSTEM

BACKGROUND OF THE INVENTION

Various types of parking lot guides are known in the prior art. However, what is needed is a parking space management system including an electronic parking space guide body, a pair of weight sensors, and a parking lot guide body. The pair of weight sensors is in operational communication with the parking space guide body and the parking lot guide body. The parking space management system is provided to make navigation of a parking garage much simpler. Activation of the pair weight sensors causes the parking space guide body to activate a red light emitting diode that indicates a space is occupied and allows a driver to avoid wasting time trying to park in that parking space. When only one of the pair of weight sensors is activated within a parking space, the parking space guide body activates a flashing amber second light with the word "REPARK" and a speaker on the parking space guide body is configured to play a pre-recorded third message to remind a driver to re-park. Additionally, deactivation of the pair of weight sensors causes the parking space guide body to activate a blinking green light with the word "OPEN" to indicate a parking space is open and to active the speaker to play a pre-recorded second message bidding the driver good-bye. The parking lot guide body is provided to help drivers find open levels within the parking garage. The parking lot guide body is disposed at an entrance to the parking garage and at the entrances to each subsequent parking level. The parking lot guide body has light emitting diodes that indicate if a level is "FULL" and has no open parking spaces, or if a level is "OPEN" and has at least one open parking space. The parking lot guide body is configured to indicate the number of parking spaces available.

FIELD OF THE INVENTION

The present invention relates to parking lot guides, and more particularly, to a parking space management system that comprises an electronic parking space guide body, a pair of weight sensors, and a parking lot guide body.

SUMMARY OF THE INVENTION

The general purpose of the present parking space management system, described subsequently in greater detail, is to provide a parking space management system which has many novel features that result in a parking space management system which is not anticipated, rendered obvious, suggested, or even implied by prior art, either alone or in combination thereof.

To accomplish this, the present parking space management system includes a parallelepiped electronic parking space guide body that is vertically disposed within each of a plurality of parking spaces on each parking garage level of a plurality of parking garage levels within a multi-level parking garage. The electronic parking space guide body has a front side, a rear side, top side, a bottom side. A pole disposed on the bottom side allows the electronic parking space guide body to be disposed in a parking space. A plurality of upper light emitting diodes is centrally disposed and vertically aligned on the front side, and includes a blinking green first light with the word "OPEN", an amber second light with the word "REPARK", and a red third light. The blinking green first light indicates an open parking space, the amber second light flashes to indicate that a car is parked incorrectly when only one of the pair of the weight sensors in one of the respective parking spaces is activated, and the red third light indicates that a parking space is occupied when both of the weight sensors in one of the respective parking spaces is activated. A rectangular bottom light emitting diode light disposed on the front side bears the word "RESERVED" and is provided to indicate that a parking space is a reserved parking space or is reserved for a handicapped driver. The rectangular bottom light emitting diode can be controlled to illuminate in a blue color to indicate that the respective parking space is reserved for the handicapped driver or an amber color to indicate reservation for other purposes. An amplified speaker is provided on each parking space guide body to play pre-recorded messages. A central processing unit is in wireless communication with each of the upper light emitting diodes, the bottom light emitting diode light, and the speaker.

A pair of weight sensors is disposed on each parking space and is in operational communication with the central processing unit. When a car is parked in one of the parking spaces, the respective pair of weight sensors is activated and the respective third light is activated and the speaker is configured to play a pre-recorded first message, which is preferably a greeting message recorded in a female voice provided to make a person feel good. Alternately, when a car is not parked on both of the weight sensors in the respective parking space, the respective pair of weight sensors is deactivated and the respective first light is activated. When a car is parked incorrectly within the respective parking space as indicated by the activation of only one of the pair of weight sensors, the respective second light is activated and the speaker is configured to play a pre-recorded third message to remind a driver to re-park continuously until the driver has re-parked the vehicle to activate both of the weight sensors in the respective parking space. Preferably the third message will be recorded in a female voice. Each parking space guide body is equipped with a strip printer and a liquid crystal display monitor. The strip printer is configured to print a paper ticket to identify the parking space in which the driver's car is parked as a reminder of the location of the car upon return to the parking garage. The liquid crystal display monitor is wirelessly connected to a central processing unit and an amplified speaker in operational communication therewith to prompt the driver to print the paper ticket and, further, voice activated. Immediately following the activation of the pair of the weight sensors in one of the respective parking spaces, the speaker is configured to play a pre-recorded first message to welcome the driver immediately followed by a pre-recorded fourth message that prompts a driver to print the paper ticket. One embodiment of the parking space guide is not equipped with a printer and a liquid crystal display.

A parallelepiped parking lot guide body is disposed on each of a plurality of parking garage levels within the parking garage and proximal an entrance to the first parking garage level of the plurality of parking garage levels. The parking lot guide body is provided to alert drivers of the available spaces on a parking garage level or, alternately, that the parking garage level is full and that the driver needs to check a different parking garage level. Each parking lot guide body has a front face, a back face, a left face, a right face, a top face, a bottom face, a beam centrally and vertically protruding from the bottom face, a plurality of lot level indicia vertically disposed on the front face proximal the left face, a plurality of rectangular first light emitting diodes display boxes centrally disposed on the front face, a plurality of rectangular second light emitting diode display boxes disposed on the front face proximal the right face. The parking lot guide body is in operational communication with the central processing unit within each parking space guide body on each of the respective parking garage levels. The plurality of lot level indicia is provided to indicate the parking garage level. The plurality of first light emitting diode display boxes has a fourth indicia, which is the word "OPEN", and is activated when at least one of the pair of weight sensors on a parking space on the respective parking garage level is deactivated. The plurality of second light emitting diode display boxes has a fifth indicia, which is the word "FULL", and is activated when the pair of weight sensors on all of the parking spaces on the respective parking garage level is activated. Once less than a predetermined number of parking spaces are available on a respective one of the parking garage levels, the plurality of second light emitting diode display boxes is configured to indicate the number of available spots on one of the plurality of parking levels. When all of the parking spaces on one of the plurality of parking levels are full, the corresponding one of the plurality of second light emitting diode display boxes will activate and indicate that the level is full.

A control panel is provided to shut down the central processing unit from a remote location. The control panel can also be used to reprogram the central processing unit to turn on or turn off the bottom light emitting diode which indicates if a parking space is reserved or open for public use.

Thus has been broadly outlined the more important features of the present parking space management system so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 7 thereof, an example of the instant parking space management system employing the principles and concepts of the present parking space management system and generally designated by the reference number 10 will be described.

Referring to FIGS. 1 through 7 the present parking space management system 10 is illustrated. The parking space management system 10 includes a parallelepiped electronic parking space guide body 20 vertically disposed within each of a plurality of parking spaces on each parking garage level of a plurality of parking garage levels within a multi-level parking garage. The electronic parking space guide body 20 has a front side 22, a rear side 24, top side 26, a bottom side 28, and a pole 30 centrally disposed on the bottom side 28. A plurality of upper light emitting diodes 32 is centrally disposed and vertically aligned on the front side 22. A first light 34 of the plurality of light emitting diodes 32 bears a first indicia 36, which is the word "OPEN", and is configured to indicate when a parking space is available. An second light 38 of the plurality of light emitting diodes 32 bears a second indicia 40, which is the word "REPARK" and is configured to indicate that a car is parked incorrectly or outside of the parking space. A third light 42 of the plurality of light emitting diodes 32 is configured to indicate that a parking space is occupied. A rectangular bottom light emitting diode light 42 is disposed on the front side 22 proximal the bottom side. The bottom light emitting diode light 42 bears third indicia 44, which is the word "RESERVED", and is configured to indicate that a parking space is a reserved parking space. A central processing unit 45 is in wireless communication with each of the plurality of upper light emitting diodes 32 and the bottom light emitting diode light 42. An amplified speaker 46 is disposed on the front side 22 proximal the bottom side 28, in a position more proximal the bottom side 32 than the bottom light emitting diode light 42 and is in operational communication with the central processing unit 45.

Figure 3:
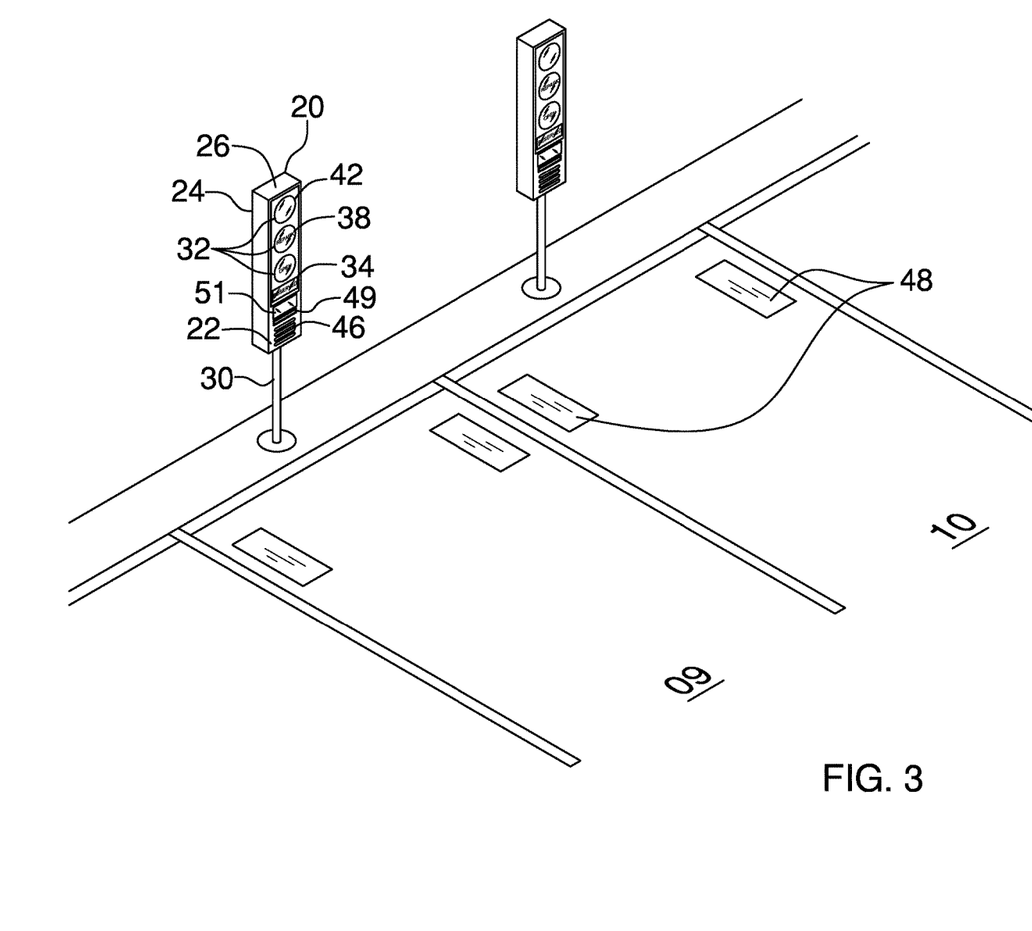
FIG. 3 is an in-use view of the electronic parking space guide body and a pair of weight sensors in a parking space.
Figure 5:
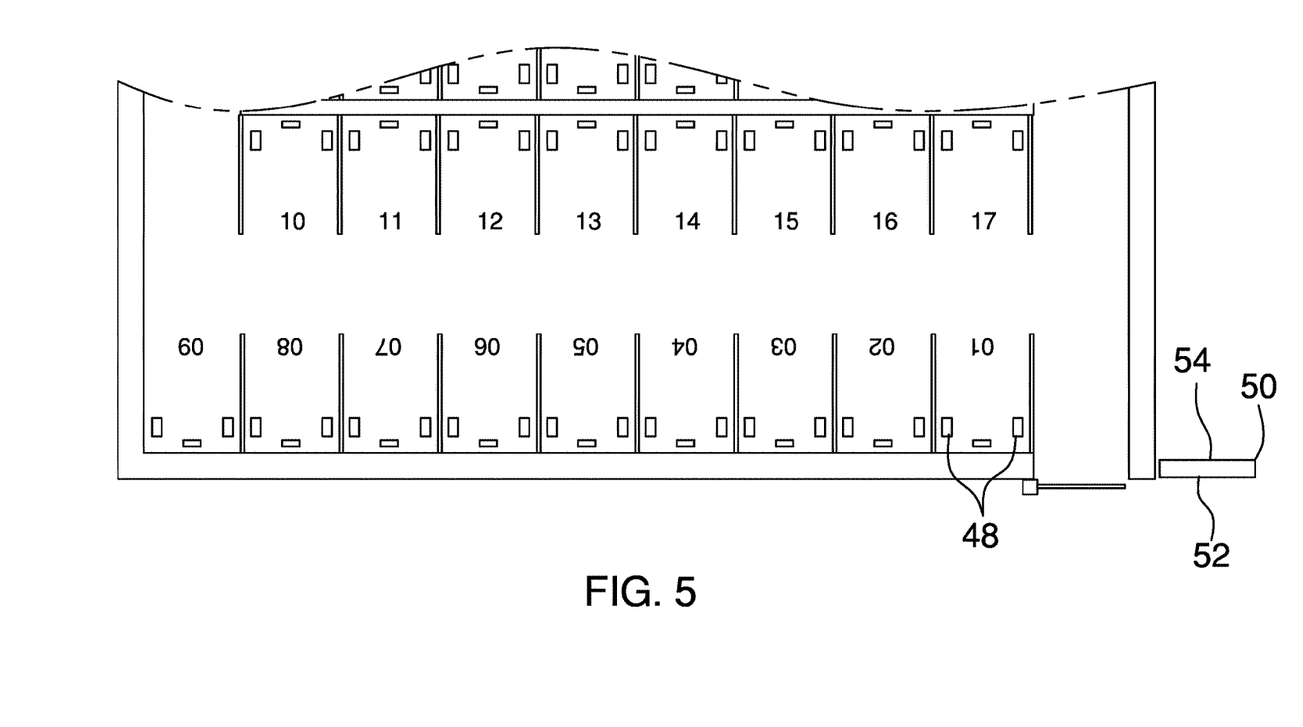
FIG. 5 is a top plan view of one parking garage level of a plurality of parking garage levels with a parking lot guide body proximal an entrance thereof, a plurality of parking spaces within the one parking garage level, a pair of weight sensors on each of the plurality of parking spaces, and an electronic parking space guide body on each of the plurality of parking spaces.

A pair of weight sensors 48 is disposed on each parking space of the plurality of parking spaces. The pair of weight sensors 48 is in operational communication with the electronic parking space guide body 20. When a car is parked in a respective one of the plurality of parking spaces, the respective pair of weight sensors 48 is activated, the respective third light 42 is activated and is red, and the speaker 46 is configured to play a pre-recorded first message configured to welcome a driver. Alternately, when a car is not parked in the respective parking space, the respective pair of weight sensors 48 is deactivated and the respective first light 34 is activated and blinks green and the speaker is activated to play a pre-recorded second message configured to bid goodbye to a driver. When only one of the pair of weight sensors 48 is activated in a respective one of the parking spaces, such as when the car is parked incorrectly, the respective second light 38 is activated and is illuminated in amber and the speaker 46 is activated to play a pre-recorded third message configured to continuously remind a driver to re-park until both weight sensors 48 are activated.

Figure 1:
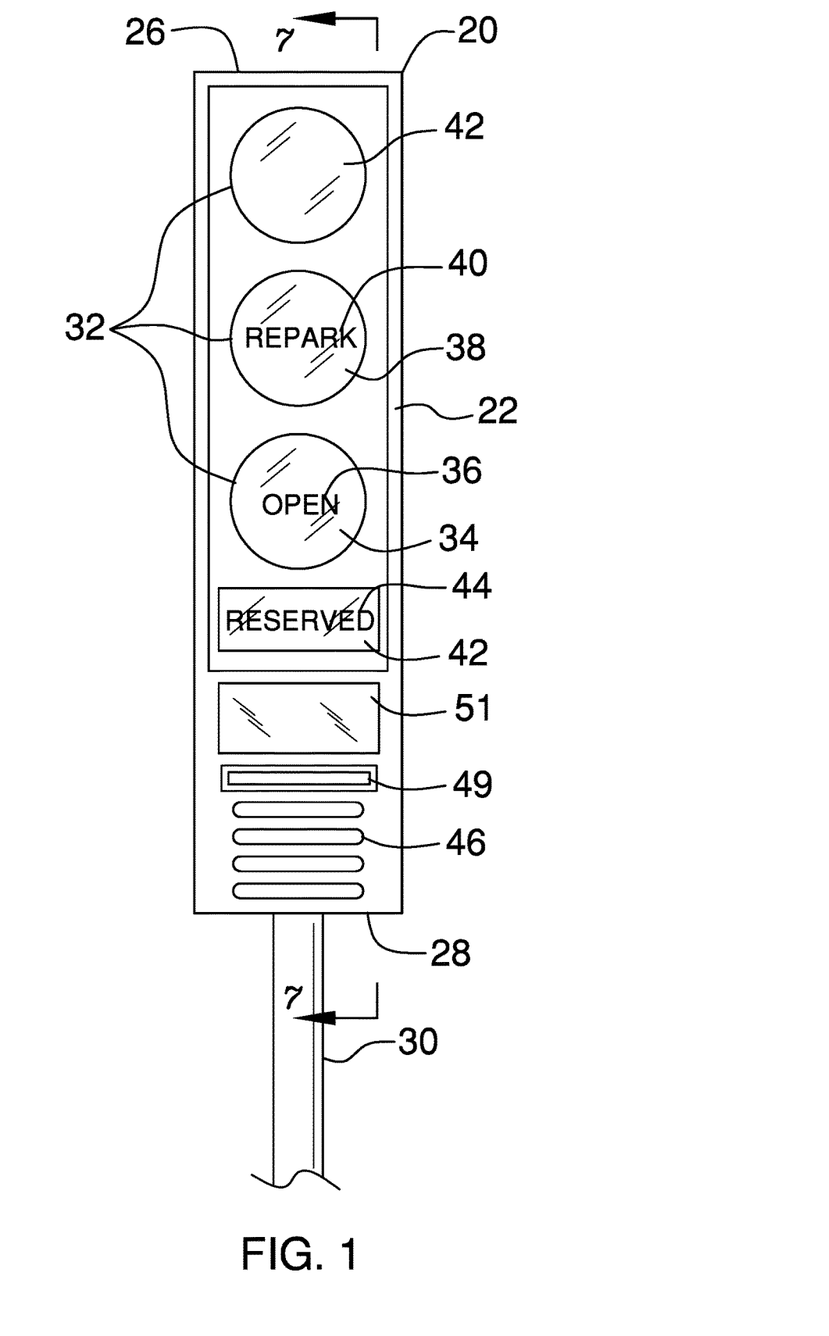
FIG. 1 is a front elevation view of an electronic parking space guide body.

Each parking space guide body 20 is equipped with a strip printer 49 and a liquid crystal display touch-screen monitor 51. The strip printer 49 is configured to print a paper ticket to identify the parking space in which the driver's car is parked as a reminder of the location of the car upon return to the parking garage. The liquid crystal display monitor 51 is in wireless operational communication with the central processing unit 45 and the speaker 46. The speaker 46 is configured to play the pre-recorded first message immediately followed by a pre-recorded fourth message that prompts a driver to print the paper ticket immediately following the activation of the weight sensors 48.

Figure 2:
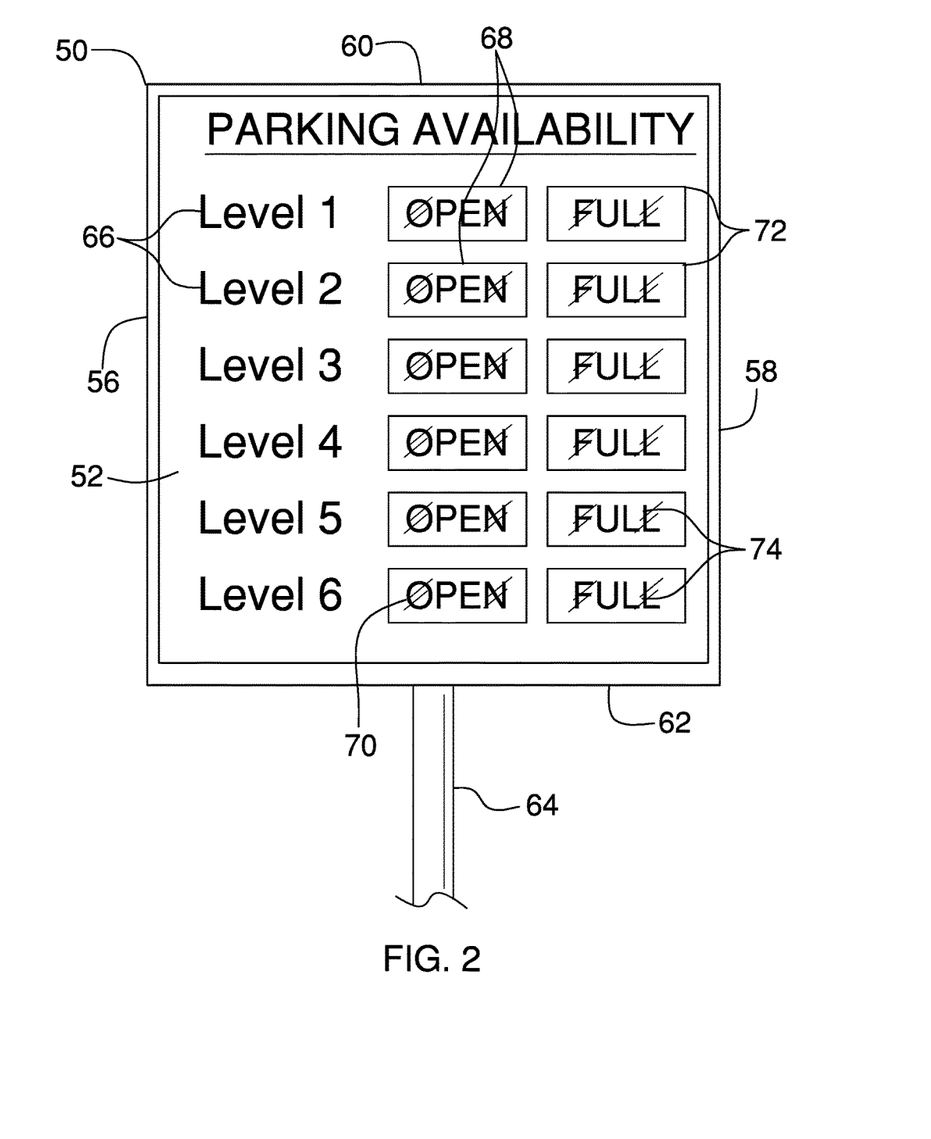
FIG. 2 is a front elevation view of a parking lot guide body.
Figure 4:
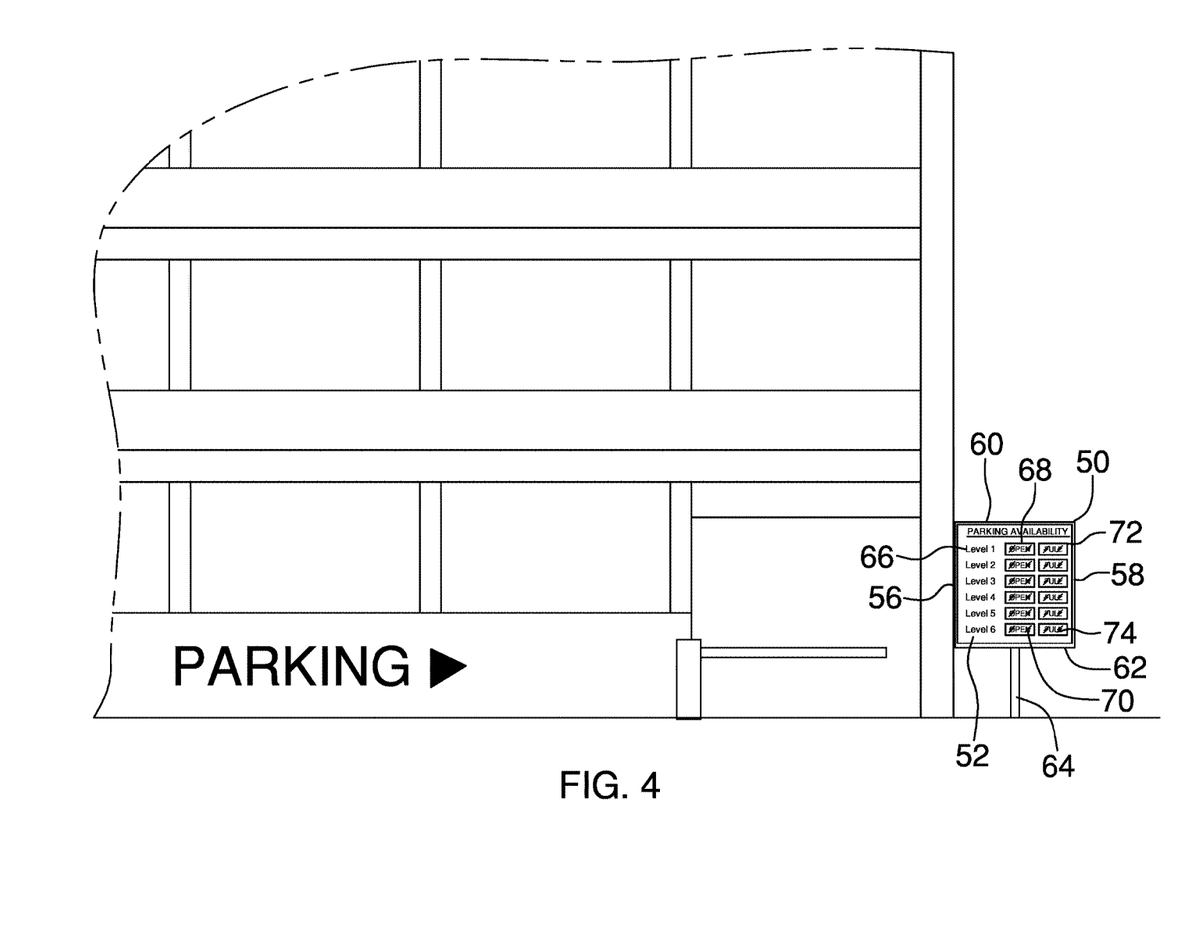
FIG. 4 is an in-use view of the parking lot guide body at an entrance to a parking garage.

A parallelepiped parking lot guide body 50 is disposed on each of a plurality of parking garage levels within the parking garage. The parking lot guide body disposed on a first parking garage level of the plurality of parking garage levels being disposed proximal an entrance thereto. Each parking lot guide body 50 has a front face 52, a back face 54, a left face 56, a right face 58, a top face 60, a bottom face 62, and a beam 64 centrally and vertically protruding from the bottom face 62. The parking lot guide body 50 is in operational communication with the central processing unit 45 within each parking space guide body 20 on each of the respective parking garage levels. A plurality of lot level indicia 66 is vertically disposed on the front face 52 proximal the left face 56. The plurality of lot level indicia 66 is configured to indicate the respective parking garage level of the plurality of parking garage levels.

A plurality of rectangular first light emitting diode display boxes 68 is centrally and vertically disposed on the front face 52 in alignment with the plurality of lot level indicia 66. Each of the plurality of first light emitting diode display boxes 68 has a fourth indicia 70, which is the word "OPEN". Each of the plurality of first light emitting diode display boxes 68 is configured to activate when the pair of weight sensors 48 on at least one parking space on the respective parking garage levels is deactivated. A plurality of rectangular second light emitting diode display boxes 72 is disposed on the front face 52 proximal the right face 58 in alignment with the plurality of first light emitting diode display boxes 68 and the lot level indicia 66. Each of the plurality of second light emitting diode display boxes 72 has a fifth indicia 74, which is the word "FULL". Each of the plurality of second light emitting diode display boxes 72 is configured to activate when the pair of weight sensors 48 on all of the parking spaces on the respective parking garage level is activated. Once there are less than a pre-determined number of parking spaces available on one of the plurality of parking garage levels, the plurality of second light emitting diode display boxes 72 is configured to indicate the number of available spots on the respective parking level. When all of the parking spaces on one of the plurality of parking levels are full, the corresponding one of the plurality of second light emitting diode display boxes 72 is activated and indicates that the respective lot level is full.

Figure 6:
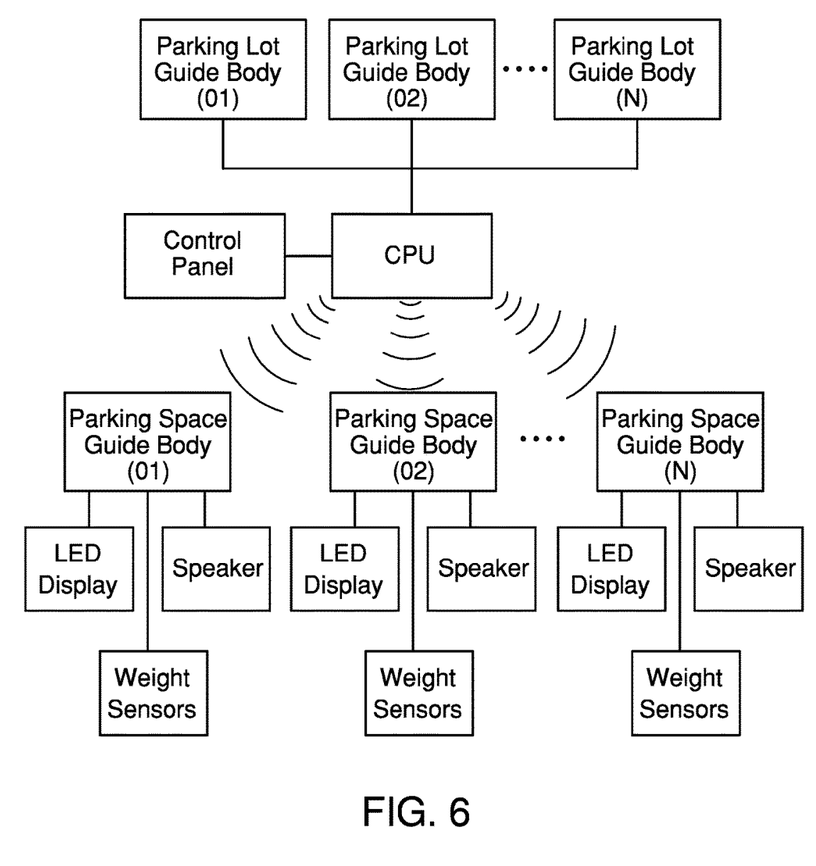
FIG. 6 is a block diagram of operations.
Figure 7:
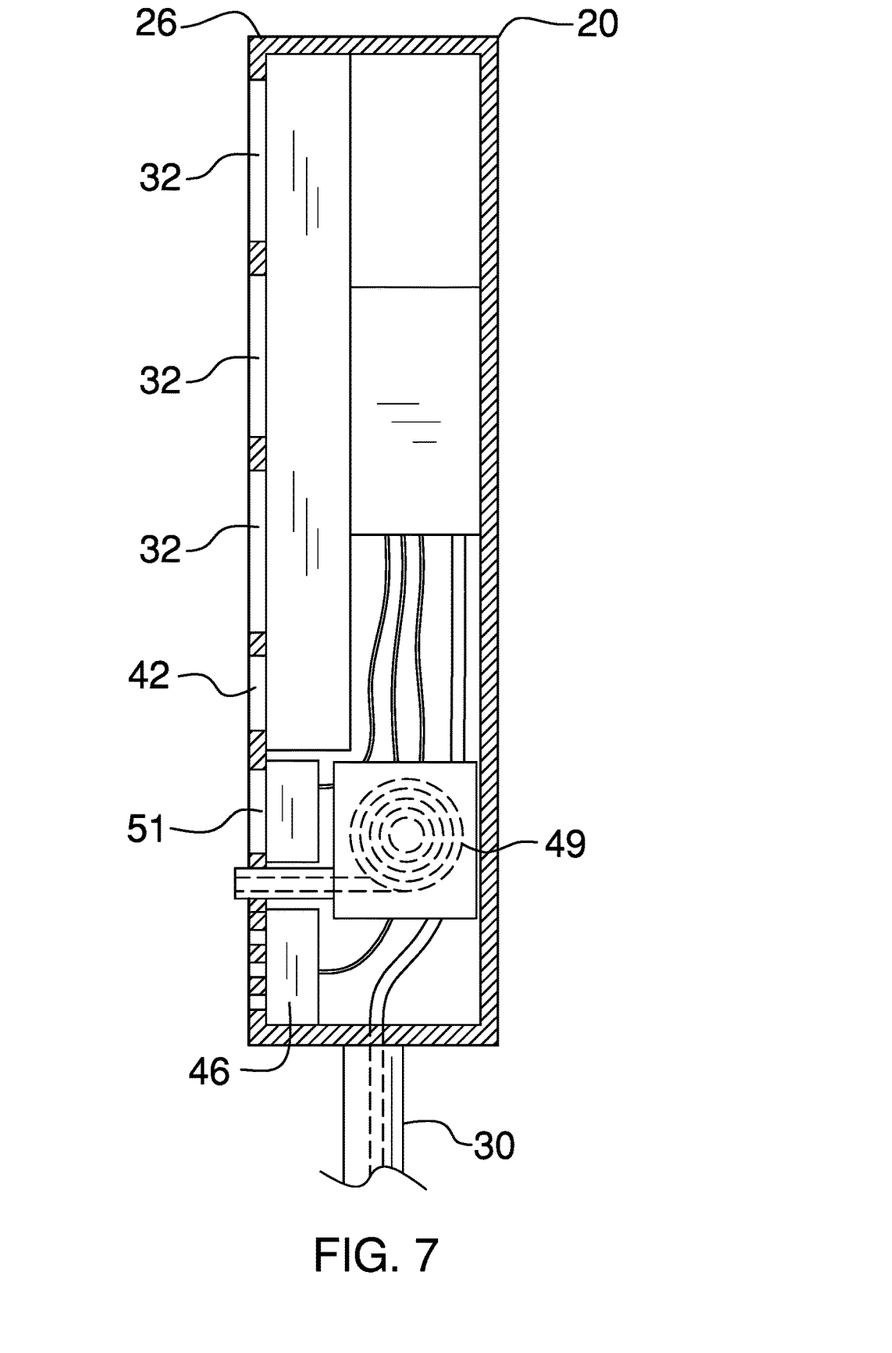
FIG. 7 is a cross-sectional view taken along line 7-7 of FIG. 1.

A control panel 76 is provided to shut down the central processing unit 45 from a remote location. The control panel 76 can also be used to reprogram the central processing unit 45 to activate or alternately deactivate the bottom light emitting diode 42 which indicates if a parking space is reserved, reserved for a handicapped driver, or open for public use.

What is claimed is:

1. A parking space management system comprising:
    a parallelepiped electronic parking space guide body vertically disposed within each of a plurality of parking spaces on each parking garage level of a plurality of parking garage levels within a multi-level parking garage, each parking space guide body having a front side, a rear side, a top side, and a bottom side, each electronic parking space guide body comprising:
    a pole centrally disposed on the bottom side;
    a plurality of upper light emitting diodes centrally disposed and vertically aligned on the front side, a first light of the plurality of light emitting diodes bearing a first indicia and being configured to indicate when a parking space is available, a second light of the plurality of light emitting diodes bearing a second indicia and being configured to indicate that a car is outside of the parking space, and a third light of the plurality of light emitting diodes being configured to indicate that a parking space is occupied, wherein the first indicia is the word "OPEN" and the second indicia is the word "REPARK";
    a bottom light emitting diode light being disposed on the front side proximal the bottom side, the light emitting diode light bearing a third indicia and being configured to indicate that a parking space is a reserved parking space, wherein the third indicia is the word "RESERVED"; and
    an amplified speaker disposed on the front side proximal the bottom side, in a position more proximal the bottom side than the bottom light emitting diode light;
    a pair of weight sensors disposed on each parking space of the plurality of parking spaces, wherein when a car is parked in a respective one of the plurality of parking spaces, the respective pair of weight sensors is activated and the respective third light is activated and the speaker plays a pre-recorded first message, wherein when a car is not parked in the respective parking space, the respective pair of weight sensors is deactivated and the respective first light is activated, and wherein when only one of the pair of weight sensors in the respective one of parking spaces is activated indicating a car is parked incorrectly within the respective parking space, the respective second light is activated and the speaker is activated to play a pre-recorded third message; wherein immediately upon removal of weight on the respective pair of weight sensors, the speaker is activated to play a pre-recorded second message;
    a central processing unit, wherein the central processing unit is in wireless communication with the pair of weight sensors, the plurality of upper light emitting diodes, the bottom light emitting diode, and the amplified speaker; and
    a control panel in operational communication with the central processing unit, wherein the control panel is configured to shut down the central processing unit or, alternately, activate the central processing unit, wherein the control panel is configured to reprogram the central processing unit to change the bottom light emitting diode when a parking space is reserved, or alternately, is available for public use.

2. The parking space management system of claim 1 further comprising:
    a strip printer disposed within each parking space guide body, the strip printer being in wireless communication with the central processing unit;
    a liquid crystal display monitor disposed on the front side between the bottom light emitting diode and the speaker, the liquid crystal display monitor being in wireless communication with the central processing unit, wherein upon activation of the weight sensors and immediately following the playing of the pre-recorded first message, the speaker is configured to play a pre-recorded fourth message configured to prompt a driver to activate the strip printer, wherein upon activation of the strip printer, the strip printer will print a paper ticket that is configured to indicate a parking space number of the parking space.

3. The parking space management system of claim 1 wherein each of the first light, the second light, and the third light of each respective parking space guide body is circular.

4. The parking space management system of claim 1 wherein the bottom light of each respective parking space guide body is rectangular.

5. The parking space management system of claim 1 wherein the bottom light of each respective parking space guide body is rectangular.

6. The parking space management system of claim 1 wherein the pre-recorded first message is configured to welcome the driver, wherein the pre-recorded second message is configured to deliver a good-bye message, wherein the pre-recorded third message is configured to continuously remind a driver to re-park until both of the weight sensors in the respective parking space are activated.

7. The parking space management system of claim 2 wherein the fourth message is configured to prompt a driver to print a paper ticket.

8. The parking space management system of claim 1 further comprising:
a parallelepiped parking lot guide body disposed on each of a plurality of parking garage levels within the parking garage, the parking lot guide body disposed on a first parking garage level of the plurality of parking garage levels being disposed in a position proximal an entrance thereto, each parking lot guide body having a front face, a back face, a left face, a right face, a top face, a bottom face, the parking lot guide body being in operational communication with a central processing unit, each parking lot guide body comprising:
a beam centrally and vertically protruding from the bottom face;
a plurality of lot level indicia vertically disposed on the front face proximal the left face, the plurality of lot level indicia being configured to indicate the respective parking garage level of the plurality of parking garage levels;
a plurality of first light emitting diode display boxes centrally and vertically disposed on the front face, the plurality of first light emitting diode display boxes being in alignment with the plurality of lot level indicia, each of the plurality of first light emitting diode display boxes having a fourth indicia, wherein the fourth indicia is the word "OPEN", each of the plurality of first light emitting diode display boxes being configured to activate when the pair of weight sensors on at least one parking space on the respective parking garage level is deactivated; and
a plurality of second light emitting diode display boxes disposed on the front face proximal the right face in alignment with the plurality of first light emitting diode display boxes and the first light emitting diode display boxes, each of the plurality of second light emitting diode display boxes having a fifth indicia, wherein the fifth indicia is the word "FULL", each of the plurality of second light emitting diode display boxes being configured to activate when the pair of weight sensors on all of the parking spaces on the respective parking garage level is activated.

9. The parking space management system of claim 7 wherein each of the plurality of first light emitting diode display boxes and each of the plurality of second light emitting diode display boxes is rectangular.

10. The parking space management system comprising:
a central processing unit;
a control panel in operational communication with the central processing unit, wherein the control panel is configured to shut down the central processing unit or, alternately, activate the central processing unit;
a parallelepiped electronic parking space guide body vertically disposed within each of a plurality of parking spaces on each parking garage level of a plurality of parking garage levels within a multi-level parking garage, each parking space guide body having a front side, a rear side, a top side, and a bottom side, each electronic parking space guide body comprising:
a pole centrally disposed on the bottom side;
a plurality of circular upper light emitting diodes centrally disposed and vertically aligned on the front side, a first light of the plurality of light emitting diodes bearing a first indicia configured to indicate when a parking space is available, a second light of the plurality of light emitting diodes bearing a second indicia and being configured to indicate that a car is outside of or incorrectly parked within the parking space, and a third light of the plurality of light emitting diodes being configured to indicate that a parking space is occupied, wherein the first indicia is the word "OPEN" and the second indicia is the word "REPARK";
a rectangular bottom light emitting diode light being disposed on the front side proximal the bottom side, the light emitting diode light bearing a third indicia and being configured to indicate that a parking space is a reserved parking space, wherein the third indicia is the word "RESERVED", wherein the control panel is configured to reprogram the central processing unit to change the bottom light emitting diode when a parking space is reserved, or alternately, available for public use;
an amplified speaker disposed on the front side proximal the bottom side, in a position more proximal the bottom side than the bottom light emitting diode light, the speaker being in wireless communication with the central processing unit, the speaker being configured to play a plurality of pre-recorded messages;
a pair of weight sensors disposed on each parking space of the plurality of parking spaces, the pair of weight sensors being in wireless communication with the central processing unit and the speaker, wherein when a car is parked in a respective one of the plurality of parking spaces, the respective pair of weight sensors is activated, the respective third light is activated and is red, and the speaker plays a pre-recorded first message, wherein when a car is not parked in the respective parking space, the respective pair of weight sensors is deactivated and the respective first light is activated and blinks green, wherein when only one of the pair of weight sensors in the respective one of parking spaces is activated indicating a car is parked incorrectly within the respective parking space, the respective second light is activated and the speaker is activated to play a pre-recorded third message;
a parallelepiped parking lot guide body disposed on each of a plurality of parking garage levels within the parking garage, the parking lot guide body disposed on a first parking garage level of the plurality of parking garage levels being disposed in a position proximal an entrance thereto, each parking lot guide body having a front face, a back face, a left face, a right face, a top face, and a bottom face, the parking lot guide body being in operational communication with central processing unit, each parking lot guide body comprising:
a beam centrally and vertically protruding from the bottom face;
a plurality of lot level indicia vertically disposed on the front face proximal the left face, the plurality of lot level indicia being configured to indicate the respective parking garage level of the plurality of parking garage levels;
a plurality of rectangular first light emitting diode display boxes centrally and vertically disposed on the front face, the plurality of first light emitting diode display boxes being in alignment with the plurality of lot level indicia, each of the plurality of first light emitting diode display boxes having a fourth indicia, wherein the fourth indicia is the word "OPEN", each of the plurality of first light emitting diode display boxes being configured to activate when the pair of weight sensors on at least one parking space on the respective parking garage level is deactivated; and a plurality of rectangular second light emitting diode display boxes disposed on the front face proximal the right face in alignment with the plurality of first light emitting diode display boxes and the first light emitting diode display boxes, each of the plurality of second light emitting diode display boxes having a fifth indicia, wherein the fifth indicia is the word "FULL", each of the plurality of second light emitting diode display boxes being configured to activate when the pair of weight sensors on all of the parking spaces on the respective parking garage level is activated.

11. The parking space management system of claim 10 further comprising:

a strip printer disposed within each of the parking space guide body, the strip printer being in wireless communication with the central processing unit, the strip printer being configured to print a ticket identifying the space number of the respective parking space;

a liquid crystal display monitor disposed on the front side between the bottom light emitting diode and the speaker, the liquid crystal display monitor being in wireless communication with the central processing unit, wherein upon activation of the weight sensors and immediately following the playing of the pre-recorded first message, the speaker is configured to play a pre-recorded fourth message configured to prompt a driver to activate the strip printer, wherein upon activation of the strip printer, the strip printer will print a paper ticket that is configured to indicate a parking space number of the parking space.

* * * * *